US011121364B2

(12) United States Patent
Lee et al.

(10) Patent No.: US 11,121,364 B2
(45) Date of Patent: Sep. 14, 2021

(54) POSITIVE ELECTRODE FOR SECONDARY BATTERY AND LITHIUM SECONDARY BATTERY INCLUDING THE SAME

(71) Applicant: LG Chem, Ltd., Seoul (KR)

(72) Inventors: Kyung Min Lee, Daejeon (KR); Jung Seok Choi, Daejeon (KR); Kyung Min Kim, Daejeon (KR); Song Taek Oh, Daejeon (KR)

(73) Assignee: LG Chem, Ltd.

( * ) Notice: Subject to any disclaimer, the term of this patent is extended or adjusted under 35 U.S.C. 154(b) by 27 days.

(21) Appl. No.: 16/343,576

(22) PCT Filed: Jul. 16, 2018

(86) PCT No.: PCT/KR2018/008042
§ 371 (c)(1),
(2) Date: Apr. 19, 2019

(87) PCT Pub. No.: WO2019/022422
PCT Pub. Date: Jan. 31, 2019

(65) Prior Publication Data
US 2019/0267621 A1 Aug. 29, 2019

(30) Foreign Application Priority Data
Jul. 28, 2017 (KR) .................. 10-2017-0096435

(51) Int. Cl.
*H01M 4/36* (2006.01)
*H01M 4/505* (2010.01)
*H01M 4/525* (2010.01)
*H01M 4/58* (2010.01)
*H01M 4/62* (2006.01)
*H01M 10/052* (2010.01)
*H01M 4/485* (2010.01)
*H01M 4/13* (2010.01)
*H01M 10/42* (2006.01)
*H01M 4/02* (2006.01)

(52) U.S. Cl.
CPC ............ *H01M 4/366* (2013.01); *H01M 4/13* (2013.01); *H01M 4/485* (2013.01); *H01M 4/505* (2013.01); *H01M 4/525* (2013.01); *H01M 4/58* (2013.01); *H01M 4/5805* (2013.01); *H01M 4/62* (2013.01); *H01M 4/625* (2013.01); *H01M 10/052* (2013.01); *H01M 10/42* (2013.01); *H01M 2004/021* (2013.01); *H01M 2004/028* (2013.01)

(58) Field of Classification Search
CPC .................................................. H01M 4/366
See application file for complete search history.

(56) References Cited

U.S. PATENT DOCUMENTS

| 5,427,875 A | 6/1995 | Yamamoto et al. |
|---|---|---|
| 2004/0234858 A1 | 11/2004 | Torimae et al. |
| 2007/0026316 A1 | 2/2007 | Imachi et al. |
| 2009/0236564 A1 | 9/2009 | Yasunaga et al. |
| 2009/0301866 A1 | 12/2009 | Zaghib et al. |
| 2011/0039160 A1 | 2/2011 | Takahata et al. |
| 2014/0170448 A1* | 6/2014 | Iwayasu .................. H01M 4/62 429/61 |
| 2016/0380303 A1 | 12/2016 | Minami et al. |

FOREIGN PATENT DOCUMENTS

| EP | 2787563 A1 | 10/2014 | |
|---|---|---|---|
| EP | 3032619 A1 | 6/2016 | |
| JP | H04328278 A | 11/1992 | |
| JP | H04329268 A * | 11/1992 | ............ H01M 10/40 |
| JP | H05151997 A | 6/1993 | |
| JP | 2000077061 A | 3/2000 | |
| JP | 2001-338639 | * 12/2001 | |
| JP | 2001338639 A | 12/2001 | |
| JP | 2001351690 A | 12/2001 | |
| JP | 2007035488 A | 2/2007 | |
| JP | 2008181830 A | 8/2008 | |
| JP | 2015015156 A | 1/2015 | |
| JP | 2015056318 A | 3/2015 | |

(Continued)

OTHER PUBLICATIONS

Extended European Search Report including Written Opinion for Application No. EP18838170.1 dated Feb. 17, 2020, pp. 1-7.

(Continued)

*Primary Examiner* — Maria Laios
(74) *Attorney, Agent, or Firm* — Lerner, David, Littenberg, Krumholz & Mentlik, LLP

(57) ABSTRACT

The present invention relates to a positive electrode for a secondary battery to improve stability during overcharge, and a lithium secondary battery including the same, and particularly, to a positive electrode for a secondary battery including a positive electrode active material layer formed on a positive electrode collector, wherein the positive electrode active material layer has a double-layer structure which includes a first positive electrode active material layer formed on the positive electrode collector and a second positive electrode active material layer formed on the first positive electrode active material layer, the first positive electrode active material layer includes a first positive electrode active material, a conductive agent, and a gas generating agent generating gas during overcharge, and the second positive electrode active material layer includes a second positive electrode active material, and a lithium secondary battery including the same.

9 Claims, 1 Drawing Sheet

(56) References Cited

FOREIGN PATENT DOCUMENTS

| | | |
|---|---|---|
| JP | 2015088370 A | 5/2015 |
| JP | 2016076439 A | 5/2016 |
| JP | 2017010819 A | 1/2017 |
| JP | 2017103170 A | 6/2017 |
| KR | 20040096773 A | 11/2004 |
| KR | 20080091499 A | 10/2008 |
| KR | 20090119447 A | 11/2009 |
| KR | 101217993 B1 | 1/2013 |
| KR | 20130123492 A | 11/2013 |
| KR | 101610924 B1 | 4/2016 |
| WO | 2007043665 A1 | 4/2007 |
| WO | 2009117869 A1 | 10/2009 |

OTHER PUBLICATIONS

International Search Report for Application No. PCT/KR2018/008042 dated Oct. 17, 2018.

* cited by examiner

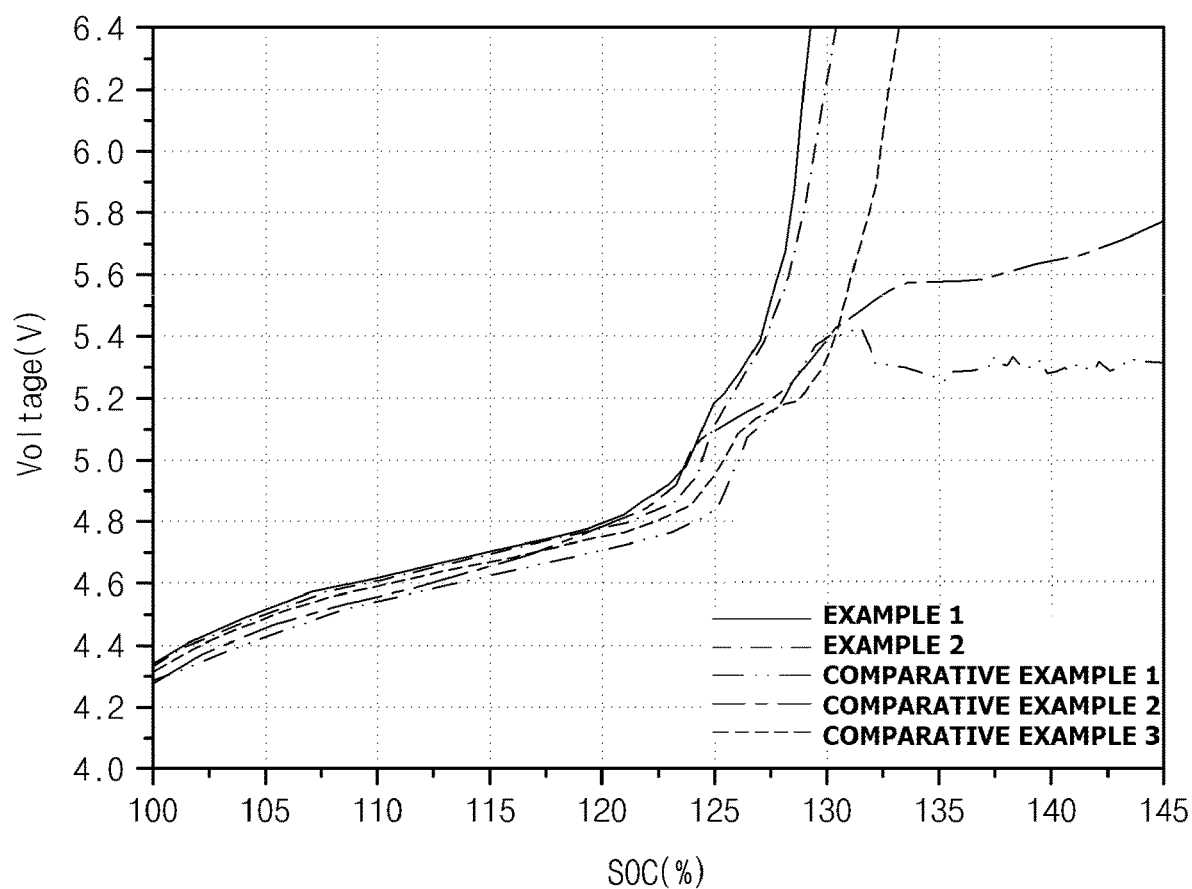

POSITIVE ELECTRODE FOR SECONDARY BATTERY AND LITHIUM SECONDARY BATTERY INCLUDING THE SAME

CROSS-REFERENCE TO RELATED APPLICATIONS

This application is a national phase entry under 35 U.S.C. § 371 of International Application No. PCT/KR2018/008042, filed Jul. 16, 2018, which claims priority to Korean Patent Application No. 2017-0096435, filed on Jul. 28, 2017, the disclosures of which are incorporated herein in their entirety by reference.

TECHNICAL FIELD

The present invention relates to a positive electrode for a secondary battery, and a lithium secondary battery including the same.

BACKGROUND ART

Demand for secondary batteries as an energy source has been significantly increased as technology development and demand with respect to mobile devices have increased, and, among these secondary batteries, lithium secondary batteries having high energy density, high operating potential, long cycle life, and low self-discharging rate have been commercialized and widely used.

Recently, there is an increasing demand for high-capacity, high energy density, and low-cost lithium secondary batteries as the lithium secondary batteries have been used as a power source of a medium and large-sized device such as an electric vehicle, and, accordingly, studies for using low-cost nickel (Ni), manganese (Mn), or iron (Fe) in replacement of expensive cobalt (Co) have been actively carried out.

One of major research projects of the lithium secondary battery is to improve stability of the battery using a high-capacity and high-output electrode active material while realizing the same.

Currently, lithium secondary batteries are designed for use in a specific voltage range (typically, 4.4 V or less) to ensure durability and stability. However, a cell potential may unintentionally rise above the range, wherein the sudden rise in the cell potential causes delithiation of a positive electrode material to generate a large amount of tetravalent Co and Ni ions, a side reaction, such as generation of gas or oxidation of an electrolyte solution, accordingly occurs, and this results in degrading the performance of the cell.

Also, if the overcharged state exceeding the allowable current or voltage is continued, it may cause serious problems in stability, for example, the cell may explode or ignite. Particularly, a lithium secondary battery used in a medium and large-sized battery pack, as a power source of electric vehicles and hybrid vehicles, is required to have a long lifetime, and, at the same time, it is more important to secure the stability because of the characteristics that a plurality of battery cells are densely packed.

With respect to a conventional secondary battery, a method of venting high-pressure internal gas at regular intervals or forming a passage through which gas may be discharged has been adopted to prevent a swelling phenomenon of the battery due to high temperature and high pressure in the battery or the resulting explosion of the battery.

However, this method is merely to check the state of the battery periodically, and the stability of the battery may not be sufficiently secured.

Therefore, there is a need to develop a battery which escapes from the risk of ignition or explosion due to the generation of gas when the battery is overcharged and is improved in stability.

DISCLOSURE OF THE INVENTION

Technical Problem

An aspect of the present invention provides a positive electrode for a lithium secondary battery which may secure stability of the battery by interrupting a charge current during overcharge in order to prevent ignition or explosion during the overcharge.

Another aspect of the present invention provides a lithium secondary battery including the positive electrode for a lithium secondary battery.

Technical Solution

According to an aspect of the present invention, there is provided a positive electrode for a secondary battery including a positive electrode active material layer formed on a positive electrode collector, wherein the positive electrode active material layer has a double-layer structure which includes a first positive electrode active material layer formed on the positive electrode collector and a second positive electrode active material layer formed on the first positive electrode active material layer, the first positive electrode active material layer includes a first positive electrode active material, a conductive agent, and a gas generating agent generating gas during overcharge, and the second positive electrode active material layer includes a second positive electrode active material.

According to another aspect of the present invention, there is provided a lithium secondary battery including the positive electrode for a lithium secondary battery, a negative electrode, and a separator disposed between the positive electrode and the negative electrode.

Advantageous Effects

Since a positive electrode according to the present invention includes a gas generating agent in a first positive electrode active material layer of a double-layer structured positive electrode active material layer, gas is generated by the gas generating agent included in the first positive electrode active material layer at an overcharge voltage, and a charge current is accordingly interrupted to terminate overcharge. Thus, stability of a battery may be improved.

With respect to a conventional positive electrode composed of a single-layered positive electrode active material layer, there was a limitation in that the application of a high-capacity positive electrode active material with relatively low stability was limited, but, in the present invention, since stability problems do not occur even if the high-capacity positive electrode active material is applied to an upper positive electrode active material layer, a secondary battery having energy density higher than a conventional battery may be prepared.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a graph illustrating an overcharge test of lithium secondary batteries prepared in Examples 1 and 2 and Comparative Examples 1 to 3 of the present invention.

MODE FOR CARRYING OUT THE INVENTION

Hereinafter, the present invention will be described in more detail.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

A positive electrode for a secondary battery according to an embodiment of the present invention is:

a positive electrode including a positive electrode active material layer formed on a positive electrode collector, wherein the positive electrode active material layer has a double-layer structure which includes a first positive electrode active material layer formed on the positive electrode collector and a second positive electrode active material layer formed on the first positive electrode active material layer, the first positive electrode active material layer includes a first positive electrode active material, a conductive agent, and a gas generating agent generating gas during overcharge, and the second positive electrode active material layer includes a second positive electrode active material.

Hereinafter, the positive electrode for a secondary battery according to the present invention will be described in more detail.

First, the positive electrode includes a positive electrode active material layer formed on a positive electrode collector.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The positive electrode active material layer according to the present invention has a double-layer structure which includes a first positive electrode active material layer formed on the positive electrode collector and a second positive electrode active material layer formed on the first positive electrode active material layer.

Since the double-layer structured positive electrode active material layer is used, application of a high-capacity positive electrode active material, which has not been applied to a single-layer structured positive electrode active material layer due to stability problems, is possible, and, accordingly, energy density of a secondary battery may be increased.

For example, in a case in which a single-layer structured positive electrode active material layer is used, since continuous charge may occur even during overcharge, swelling, ignition, or explosion may occur. Also, in a case in which stability is improved by adding a gas generating agent to the single-layer structured positive electrode active material layer, a large amount of the gas generating agent is required and, in this case, the energy density of the battery is reduced, but, in the present invention, since gas is generated at an overcharge voltage by adding the gas generating agent to a lower layer of the double-layer structured positive electrode active material layer, overcharge is terminated by interrupting a charge current, and thus, stability of the battery may be improved while minimizing the reduction of the energy density.

The first positive electrode active material layer may include a first positive electrode active material, a conductive agent, and a gas generating agent generating gas during overcharge.

The first positive electrode active material layer may include a first positive electrode active material having a structurally stable olivine structure. Specifically, the first positive electrode active material layer may include an olivine-structured first positive electrode active material represented by Formula 1 below.

$$Li_{1+a1}Fe_{1-x1}M_{x1}(PO_{4-y1})X_{y1} \quad \text{[Formula 1]}$$

In Formula 1,

M is at least one element selected from the group consisting of aluminum (Al), magnesium (Mg), nickel (Ni), cobalt (Co), manganese (Mn), titanium (Ti), gallium (Ga), copper (Cu), vanadium (V), niobium (Nb), zirconium (Zr), cerium (Ce), indium (In), zinc (Zn), and yttrium (Y), X is at least one element selected from the group consisting of fluorine (F), sulfur (S), and nitrogen (N), $-0.5 \leq a1 \leq 0.5$, $0 \leq x1 \leq 0.5$, and $0 \leq y1 \leq 0.3$.

The first positive electrode active material may be included in an amount of 8.9 wt % to 88.9 wt %, for example, 30 wt % to 70 wt % based on a total weight of the first positive electrode active material layer.

The gas generating agent generating gas during overcharge, which is included in the first positive electrode active material layer according to the present invention, may include at least one selected from the group consisting of lithium carbonate and lithium oxalate.

For example, the overcharge voltage may be 4.5 volt or more, preferably 4.8 V or more, and more preferably 5 V or more, and more preferably 4.5 volts to 6.4 volts. In a case in which the above-described gas generating agent is included, gas is generated while the gas generating agent is decomposed at 4.5 V or more. For example, with respect to $Li_2CO_3$, gas may be generated by the following reactions.

$$2Li_2CO_3 \rightarrow 2Li_2O+CO+CO_2+\tfrac{1}{2}O_2$$

$$7Li_2CO_3 \rightarrow Li_2C_2+6Li_2O+5CO_2+5/2O_2$$

A peeling-off phenomenon at an interface between the first positive electrode active material layer and the positive electrode collector occurs due to the gas generated from the gas generating agent. Also, since swelling of the first positive electrode active material layer occurs due to the generated gas and a volume of the gas generating agent is simultaneously reduced, electrical resistance of the first positive electrode active material layer is significantly increased. Accordingly, the charge current is interrupted and an overcharge end voltage is reached.

Particularly, in a case in which the olivine-structured first positive electrode active material is used with the gas generating agent, a volumetric shrinkage of the first positive electrode active material occurs due to delithiation above the overcharge voltage. Specifically, a volume of the olivine-structured first positive electrode active material shrinks while lithium in the first positive electrode active material is deintercalated above the overcharge voltage, and, as a result, the volume changes rapidly at a high voltage of 4.5 V or more in comparison to other active materials or materials. Thus, time for reaching the overcharge end voltage may be further accelerated due to a swelling effect caused by the gas generating agent during the overcharge, changes in volume of the first positive electrode active material layer caused by the olivine-structured first positive electrode active material, and the peeling-off phenomenon at the interface due to the above effect.

The gas generating agent may be included in an amount of 10 wt % to 90 wt %, for example, 30 wt % to 60 wt % based on the total weight of the first positive electrode active material layer. For example, in a case in which the gas generating agent is included in an amount of less than 10 wt % based on the total weight of the first positive electrode active material layer, since the peeling-off phenomenon of the first positive electrode active material layer due to the generation of gas during the overcharge may be delayed, the stability may be deteriorated, and, in a case in which the gas generating agent is included in an amount of greater than 90 wt %, since the amount of the first positive electrode active material is relatively decreased, the energy density is reduced and resistance of the first positive electrode active material may be increased during the overcharge or a synergistic effect of charge termination due to the volume change may be reduced.

Any conductive agent may be used as the conductive agent included in the first positive electrode active material layer without particular limitation as long as it has electron conductivity without causing adverse chemical changes. Examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and at least one thereof may be included.

The conductive agent may be included in the first positive electrode active material layer, and, for example, the conductive agent may be coated on a surface of the first positive electrode active material. Electrons may move between the positive electrode collector and the second positive electrode active material layer by the conductive agent included in the first positive electrode active material layer.

The conductive agent may be included in an amount of 0.1 wt % to 60 wt %, preferably 1 wt % to 40 wt %, and more preferably 1 wt % to 10 wt % based on the total weight of the first positive electrode active material layer. In a case in which the conductive agent is included in the first positive electrode active material layer in an amount of 0.1 wt % to 60 wt %, an effect of reducing resistance of the secondary battery including the same may be achieved.

The first positive electrode active material layer may further selectively include a binder, if necessary.

The binder improves the adhesion between first positive electrode active material particles and the adhesion between the first positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber (SBR), a fluorine rubber, or various copolymers thereof, and at least one thereof may be included. The binder may be included in an amount of 1 wt % to 30 wt % based on the total weight of the first positive electrode active material layer.

The first positive electrode active material layer may have a thickness of 30 μm or less, preferably 0.1 μm to 20 μm, and more preferably 1 μm to 10 μm. For example, in a case in which the thickness of the first positive electrode active material layer is greater than 30 μm, since the amount of the gas generating agent included relative to the total amount of the positive electrode active material or capacity is also increased, a volume of the electrode is increased, and thus, the energy density of the battery including the same may be reduced.

Also, the second positive electrode active material layer may include a second positive electrode active material.

The second positive electrode active material layer may include a layer-structured second positive electrode active material with high-capacity characteristics represented by Formula 2 below.

 [Formula 2]

$$Li_{1+x}(Ni_aCO_bM'_c)_{1-x}O_2$$ [Formula 2]

In Formula 2, M' is at least one element selected from the group consisting of Mn, Al, Ti, Ga, Cu, V, Nb, Zr, Ce, In, Zn, and Y, $0<a<1$, $0<b<1$, $0<c<1$, and $-0.1 \le x \le 0.2$, preferably $0.3<a<1$, $0.1 \le b<1$, and $0.1 \le c<1$, and more preferably $0.5 \le a<1$, $0.1 \le b \le 0.3$, and $0.1 \le c \le 0.3$.

For example, the second positive electrode active material represented by Formula 2 may include at least one selected from the group consisting of $LiNi_{0.6}Co_{0.2}Mn_{0.2}O_2$, $LiNi_{0.5}Co_{0.2}Mn_{0.3}O_2$, $LiNi_{0.5}Co_{0.3}Mn_{0.2}O_2$, and $LiNi_{0.8}Co_{0.1}Mn_{0.1}O_2$, but the present invention is not limited thereto.

The second positive electrode active material may be included in an amount of 40 wt % to 98.9 wt %, for example, 60 wt % to 98.9 wt % based on a total weight of the second positive electrode active material layer.

A positive electrode with high-capacity characteristics may be prepared by using the layer-structured positive electrode active material with high-capacity characteristics as the second positive electrode active material layer.

For example, in a case in which a layer-structured positive electrode active material layer with high-capacity characteristics is used alone, there may be a possibility of ignition or explosion due to its stability problem, and, in contrast, in a case in which an olivine-structured positive electrode active material layer is used alone, the energy density may be reduced.

However, both stability and high-capacity effects may be achieved by using the olivine-structured positive electrode active material with excellent stability and the layer-structured positive electrode active material with high-capacity characteristics in appropriate amounts as in the present invention.

The second positive electrode active material layer may further selectively include a conductive agent and a binder, if necessary.

Any conductive agent may be used as the conductive agent included in the second positive electrode active material layer without particular limitation as long as it has electron conductivity without causing adverse chemical changes. Examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and at least one thereof may be included.

The conductive agent may be included in an amount of 0.1 wt % to 30 wt %, preferably 1 wt % to 20 wt %, and more preferably 1 wt % to 10 wt % based on the total weight of the second positive electrode active material layer. In a case in which the conductive agent is included in the second positive electrode active material layer in an amount of 0.1 wt % to 30 wt %, an effect of reducing resistance of the secondary battery including the same may be achieved.

The binder improves the adhesion between second positive electrode active material particles and the adhesion between the first positive electrode active material layer and the second positive electrode active material layer. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber (SBR), a fluorine rubber, or various copolymers thereof, and at least one thereof may be included. The binder may be included in an amount of 1 wt % to 30 wt % based on the total weight of the second positive electrode active material layer.

A thickness of the second positive electrode active material layer is not particularly limited, and the second positive electrode active material layer may be formed by changing the thickness according to capacity of the secondary battery to be prepared.

Also, according to the present invention, an electrochemical device including the positive electrode may be prepared. The electrochemical device may specifically be a battery or a capacitor, and, for example, may be a lithium secondary battery.

The lithium secondary battery specifically includes a positive electrode, a negative electrode disposed to face the positive electrode, a separator disposed between the positive electrode and the negative electrode, and an electrolyte, wherein the positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 µm to 500 µm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to the negative electrode active material.

A compound capable of reversibly intercalating and deintercalating lithium may be used as the negative electrode active material. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

Also, the binder and the conductive agent may be the same as those previously described in the positive electrode.

The negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present invention may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present invention is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be preferably used, and a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be more preferably used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present invention stably exhibits excellent discharge capacity, output characteristics, and capacity retention, the lithium secondary battery is suitable for portable devices, such as mobile phones, notebook computers, and digital cameras, and electric cars such as hybrid electric vehicles (HEVs).

Thus, according to another embodiment of the present invention, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present invention is not particularly limited, but a cylindrical type using a can, a prismatic type, a pouch type, or a coin type may be used.

The lithium secondary battery according to the present invention may not only be used in a battery cell that is used as a power source of a small device, but may also be used as a unit cell in a medium and large sized battery module including a plurality of battery cells.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present invention to those skilled in the art.

EXAMPLES

Example 1

50 parts by weight of a $LiFePO_4$ positive electrode active material, 3 parts by weight of carbon black as a conductive agent, 3 parts by weight of polyvinylidene fluoride (PVdF) as a binder, and 44 parts by weight of $Li_2CO_3$, as a gas generating agent, were mixed in a N-methylpyrrolidone (NMP) solvent to prepare a first positive electrode active material slurry.

Separately, 94 parts by weight of a $LiNi_{0.6}Mn_{0.2}Co_{0.2}O_2$ positive electrode active material, 3 parts by weight of carbon black as a conductive agent, and 3 parts by weight of PVdF as a binder, were mixed in a NMP solvent to prepare a second positive electrode active material slurry.

A 20 μm thick Al foil was coated with the above-prepared first positive electrode active material slurry and then dried to form a 10 μm thick first positive electrode active material layer. Subsequently, the second positive electrode active material slurry was coated on the first positive electrode active material layer, dried, and then roll-pressed to prepare a positive electrode in which a second positive electrode active material layer was formed on the first positive electrode active material layer.

Artificial graphite as a negative electrode active material, a styrene-butadiene rubber (SBR) as a binder, and carbon black as a conductive agent, were mixed in a ratio of 92:4:4

(wt %) and added to distilled water as a solvent, to prepare a negative electrode slurry. A 20 μm thick negative electrode collector (Cu) was coated with the negative electrode slurry, dried, and then roll-pressed to prepare a negative electrode.

After the above-prepared positive electrode and negative electrode were stacked with a polyethylene separator to prepare an electrode assembly, the electrode assembly was put in a battery case, and an electrolyte solution, in which 1 M $LiPF_6$ was dissolved in a solvent in which ethylene carbonate, ethylmethyl carbonate, and diethyl carbonate were mixed in a ratio of 1:1:1, was injected thereinto to prepare a lithium secondary battery.

Example 2

A positive electrode and a lithium secondary battery including the same were prepared in the same manner as in Example 1 except that 20 parts by weight of a $LiFePO_4$ positive electrode active material, 3 parts by weight of carbon black as a conductive agent, 3 parts by weight of polyvinylidene fluoride (PVdF) as a binder, and 74 parts by weight of $Li_2CO_3$ as a gas generating agent, were used to prepare a first positive electrode active material slurry.

Comparative Example 1

A lithium secondary battery was prepared in the same manner as in Example 1 except that a positive electrode having a single positive electrode active material layer, which was prepared by coating an Al foil with the second positive electrode active material slurry prepared in Example 1, drying, and then roll-pressing the coated Al foil, was used.

Comparative Example 2

86 parts by weight of a $LiNi_{0.6}Mn_{0.2}Co_{0.2}O_2$ positive electrode active material, 3 parts by weight of carbon black as a conductive agent, 3 parts by weight of PVdF as a binder, and 8 parts by weight of $Li_2CO_3$, as a gas generating agent, were mixed in a NMP solvent to prepare a positive electrode active material slurry.

A lithium secondary battery was prepared in the same manner as in Example 1 except that a positive electrode having a single positive electrode active material layer, which was prepared by coating an Al foil with the above-prepared positive electrode active material slurry, drying, and then roll-pressing the coated Al foil, was used. In this case, the amount of the gas generating agent included in the entire positive electrode was the same as the amount of the gas generating agent included in the entire positive electrode of Example 2.

Comparative Example 3

94 parts by weight of $Li_2CO_3$ as a gas generating agent, 3 parts by weight of carbon black as a conductive agent, and 3 parts by weight of PVdF as a binder, were mixed in a NMP solvent to prepare a first slurry. Separately, 94 parts by weight of a $LiNi_{0.8}Mn_{0.1}Co_{0.1}O_2$ positive electrode active material, 3 parts by weight of carbon black as a conductive agent, and 3 parts by weight of PVdF as a binder, were mixed in a NMP solvent to prepare a second slurry.

A positive electrode and a lithium secondary battery including the same were prepared in the same manner as in Example 1 except that a first positive electrode active material layer and a second positive electrode active material layer were formed by respectively using the above-prepared first slurry and second slurry.

Experimental Example 1: Overcharge Test

An overcharge test was performed by using the secondary batteries prepared in Examples 1 and 2 and Comparative Examples 1 to 3. Specifically, after each of the secondary batteries was charged at 0.3 C to a full charge voltage (4.25 V) and cut-off charged at 0.05 C, each secondary battery was subjected to a rest period of 3 hours to stabilize the voltage. After the cell voltage was stabilized, each secondary battery was overcharged at 1 C to a voltage of 6.4 V.

In this regard, FIG. 1 is a graph illustrating the overcharge test of the lithium secondary batteries prepared in Examples 1 and 2 and Comparative Examples 1 to 3 of the present invention.

With respect to the lithium secondary batteries of Examples 1 and 2, it may be confirmed that, since overcharge occurs at 4.8 V or more, the voltage was rapidly increased, and, accordingly, it may be considered that an overcharge end voltage was quickly reached.

With respect to Comparative Example 1, since the NMC-based positive electrode active material having a full charge voltage of 4.2 V to 4.3 V was included, the voltage was temporarily increased during overcharge at 4.3 V or more, but, since the gas generating agent was not included, there was no point where electrical resistance rapidly increased, and thus, it was considered that an overcharge end voltage was not reached.

Also, with respect to Comparative Example 2 in which the gas generating agent was added to the single-layer structured positive electrode active material layer, since the gas generating agent was included, it was confirmed that the resistance was more increased at a high voltage than Comparative Example 1. However, since an effect of increasing the resistance of the single-layer structure of Comparative Example 2 was smaller than those of the double-layer structures of Examples 1 and 2, a voltage rise rate was found to be insignificant.

Since Examples 1 and 2 further included the LFP-based positive electrode active material, which increased the resistance at a high voltage, in the first positive electrode active material layer, the voltage rise rate may be further increased in comparison to Comparative Example 3 which did not include a positive electrode active material in the first positive electrode active material layer, and, accordingly, it was confirmed that an overcharge end voltage was reached more quickly.

The invention claimed is:
1. A positive electrode for a secondary battery comprising: a positive electrode active material layer formed on a positive electrode collector,
   wherein the positive electrode active material layer has a double-layer structure which includes a first positive electrode active material layer formed on the positive electrode collector and a second positive electrode active material layer formed on the first positive electrode active material layer,
   the first positive electrode active material layer comprises a first positive electrode active material, a conductive agent, and a gas generating agent configured to generate gas during overcharge, and
   the second positive electrode active material layer comprises a second positive electrode active material, wherein the gas generating agent is selected from the group consisting of lithium carbonate and lithium oxalate, and wherein the gas generating agent is included in an amount of 30 wt % to 90 wt % based on a total weight of the first positive electrode active material layer.

2. The positive electrode for a secondary battery of claim 1, wherein the first positive electrode active material is different from the second positive electrode active material.

3. The positive electrode for a secondary battery of claim 1, wherein the first positive electrode active material is an olivine-structured material represented by Formula 1:

$$Li_{1+a1}Fe_{1-x1}M_{x1}(PO_{4-y1})X_{y1} \quad \text{[Formula 1]}$$

wherein, in Formula 1,

M is at least one element selected from the group consisting of aluminum (Al), magnesium (Mg), nickel (Ni), cobalt (Co), manganese (Mn), titanium (Ti), gallium (Ga), copper (Cu), vanadium (V), niobium (Nb), zirconium (Zr), cerium (Ce), indium (In), zinc (Zn), and yttrium (Y), X is at least one element selected from the group consisting of fluorine (F), sulfur (S), and nitrogen (N), $-0.5 \le a1 \le 0.5$, $0 \le x1 \le 0.5$, and $0 \le y1 \le 0.3$.

4. The positive electrode for a secondary battery of claim 1, wherein the second positive electrode active material is a material represented by Formula 2:

$$Li_{1+x}(Ni_aCo_bM'_c)_{1-x}O_2 \quad \text{[Formula 2]}$$

wherein, in Formula 2,

M' is at least one element selected from the group consisting of Mn, Al, Ti, Ga, Cu, V, Nb, Zr, Ce, In, Zn, and Y, $0<a<1$, $0<b<1$, $0<c<1$, $-0.1 \le x1 \le 0.2$, and $a+b+c=-1$.

5. The positive electrode for a secondary battery of claim 1, wherein an overcharge voltage is 4.5 volts or more.

6. The positive electrode for a secondary battery of claim 5, wherein at the overcharge voltage, a peeling-off phenomenon occurs at the interface between the first positive electrode active material layer and the positive electrode collector.

7. The positive electrode for a secondary battery of claim 1, wherein the first positive electrode active material layer has a thickness of 30 µm or less.

8. A lithium secondary battery comprising the positive electrode of claim 1, a negative electrode, and a separator disposed between the positive electrode and the negative electrode.

9. The positive electrode for a secondary battery of claim 1, wherein an overcharge voltage is within a range of 4.5 volts to 6.4 volts.

* * * * *